United States Patent
Moon

(10) Patent No.: US 8,596,972 B2
(45) Date of Patent: Dec. 3, 2013

(54) ATTACHMENT INTERFACE FOR A GAS TURBINE ENGINE COMPOSITE DUCT STRUCTURE

(75) Inventor: Francis R. Moon, Granby, CT (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 13/327,737

(22) Filed: Dec. 15, 2011

(65) Prior Publication Data

US 2012/0171019 A1 Jul. 5, 2012

Related U.S. Application Data

(63) Continuation of application No. 11/839,791, filed on Aug. 16, 2007, now Pat. No. 8,206,102.

(51) Int. Cl.
*F01D 25/24* (2006.01)
*F04D 29/52* (2006.01)

(52) U.S. Cl.
USPC ............. 415/213.1; 415/214.1; 415/200

(58) Field of Classification Search
USPC ............... 415/213.1, 214.1, 200, 220
See application file for complete search history.

(56) References Cited

U.S. PATENT DOCUMENTS

| | | | |
|---|---|---|---|
| 3,000,552 A | 9/1961 | Cooper, Jr. et al. | |
| 3,566,606 A | 3/1971 | Mortlock | |
| 4,132,069 A | 1/1979 | Adamson et al. | |
| 4,428,189 A | 1/1984 | Greenberg et al. | |
| 4,471,609 A | 9/1984 | Porter et al. | |
| 4,658,579 A | 4/1987 | Bower et al. | |
| 4,826,106 A | 5/1989 | Anderson | |
| 5,118,253 A | 6/1992 | Balkeum, III | |
| 5,127,797 A | 7/1992 | Carman | |
| 5,160,248 A | 11/1992 | Clarke | |
| 5,180,281 A | 1/1993 | Burge et al. | |
| 5,251,435 A | 10/1993 | Pauley | |
| 5,354,174 A | 10/1994 | Balkeum et al. | |
| 6,227,794 B1 | 5/2001 | Wojtyczka et al. | |
| 6,328,258 B1 | 12/2001 | Porte | |
| 6,364,606 B1 | 4/2002 | Rice et al. | |
| 6,375,121 B1 | 4/2002 | Porte et al. | |
| 6,637,186 B1 | 10/2003 | Van Duyn | |
| 6,652,222 B1 | 11/2003 | Wojtyczka et al. | |
| 6,681,577 B2 | 1/2004 | Bolender et al. | |
| 6,881,032 B2 | 4/2005 | Malmborg | |
| 6,944,580 B1 | 9/2005 | Blume et al. | |
| 6,962,482 B2 | 11/2005 | Tanaka | |
| 7,010,906 B2 | 3/2006 | Cazenave et al. | |
| 7,100,358 B2 | 9/2006 | Gekht et al. | |
| 2001/0048048 A1* | 12/2001 | Riedel et al. | 244/53 B |
| 2012/0099981 A1* | 4/2012 | Verseux et al. | 415/200 |

FOREIGN PATENT DOCUMENTS

WO   WO 2009147307 A1 * 12/2009

* cited by examiner

*Primary Examiner* — Edward Look
*Assistant Examiner* — Jesse Prager
(74) *Attorney, Agent, or Firm* — Carlson, Gaskey & Olds, P.C.

(57) ABSTRACT

A duct includes first and second composite duct sections and first and second metallic support ring sections. The second metallic support ring section is adjacent to the first metallic support ring section.

18 Claims, 4 Drawing Sheets

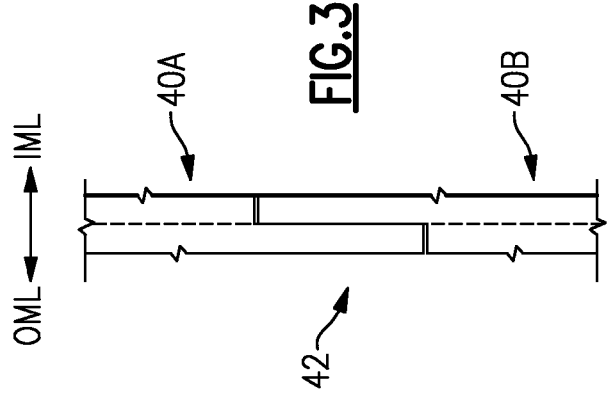
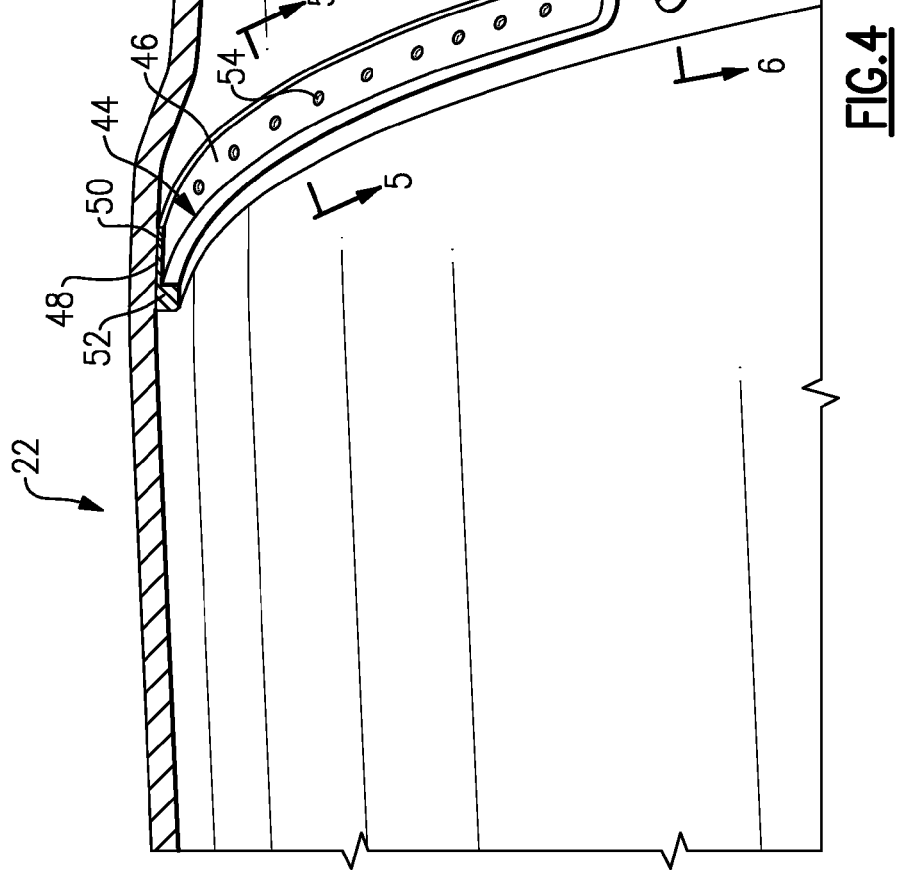

_US 8,596,972 B2_

ATTACHMENT INTERFACE FOR A GAS TURBINE ENGINE COMPOSITE DUCT STRUCTURE

REFERENCE TO RELATED APPLICATIONS

This application is a continuation application of U.S. patent application Ser. No. 11/839,791, filed Aug. 16, 2007 now U.S. Pat. No. 8,206,102.

STATEMENT REGARDING FEDERALLY SPONSORED RESEARCH OR DEVELOPMENT

The government may have certain rights to this invention pursuant to Contract No. N00019-02-C-3003 awarded by the United States Navy.

BACKGROUND

The present invention relates to a duct structure for a gas turbine engine.

A gas turbine engine, such as a turbofan engine for an aircraft, includes a fan section, a compression section, a combustion section, and a turbine section. An axis of the engine is centrally disposed within the engine, and extends longitudinally through these sections. A primary flow path extends axially through the engine. A secondary flow path is generally located radially outward of the primary flow path.

The secondary flow path is typically defined by a duct structure formed from a multiple of portions which are fitted together. Typical engine ducts are metallic structures which include various internal interface features such as grooves which are formed directly therein to support other engine system components such as flow control systems. Although effective for conventional metallic ducts, composite ducts for gas turbine engines require other interface arrangements to support the engine system components.

Accordingly, it is desirable to provide an interface arrangement for a multi-portion composite duct for the attachment of engine system components thereto.

SUMMARY

A duct according to one non-limiting embodiment includes first and second composite duct sections and first and second metallic support ring sections. The second metallic support ring section is adjacent to the first metallic support ring section.

BRIEF DESCRIPTION OF THE DRAWINGS

The various features and advantages of this invention will become apparent to those skilled in the art from the following detailed description of the currently disclosed embodiment. The drawings that accompany the detailed description can be briefly described as follows:

FIG. 3 is a simplified sectional view of the composite engine case axial interface;

FIG. 4 is a perspective inner view of the composite bypass duct illustrating an attachment interface support ring;

DETAILED DESCRIPTION OF THE DISCLOSED EMBODIMENT

Figure 1:
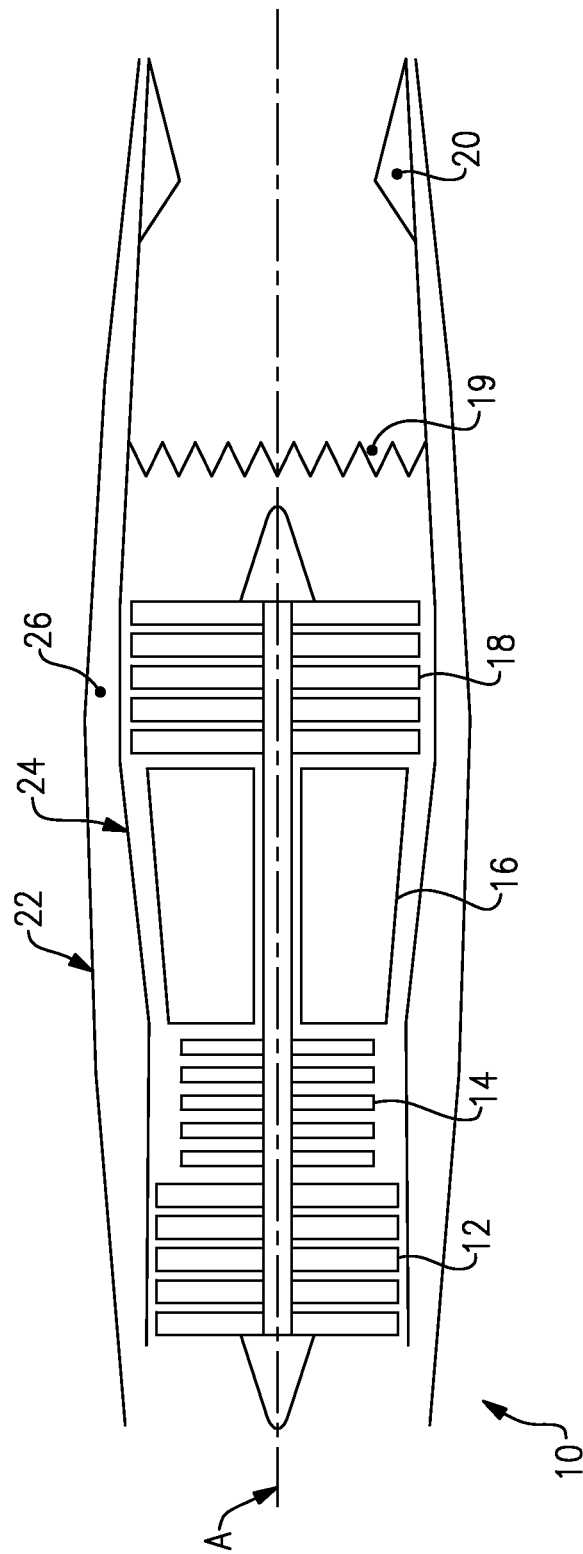
FIG. 1 is a general perspective view an exemplary gas turbine engine embodiment for use with the present invention.

FIG. 1 schematically illustrates a gas turbine engine 10 which generally includes a fan section 12, a compressor section 14, a combustor section 16, a turbine section 18, an augmentor section 19, and a nozzle section 20. The compressor section 14, combustor section 16, and turbine section 18 are generally referred to as the core engine. An axis of the engine A is centrally disposed and extends longitudinally through these sections. Within and aft of the combustor 16, engine components are typically cooled due to intense temperatures of the combustion core gases.

An engine duct structure 22 and an inner cooling liner structure 24 define an annular secondary fan bypass flow path 26 around a primary exhaust flow (illustrated schematically by arrow E). It should be understood that the engine duct structure 22 may also at least partially define various airflow paths other than the disclosed fan bypass flow path 26. The fan bypass flow path 26 guides a secondary flow or cooling airflow between the engine duct structure 22 and the inner cooling liner structure 24. Cooling airflow C and/or other secondary airflow that is different from the primary exhaust gas flow E is typically sourced from the fan section 12 and/or compressor section 14. The cooling airflow C is utilized for a multiple of purposes including, for example, pressurization and partial shielding of the nozzle section 20 from the intense heat of the exhaust gas flow F during particular operational profiles.

Figure 2:
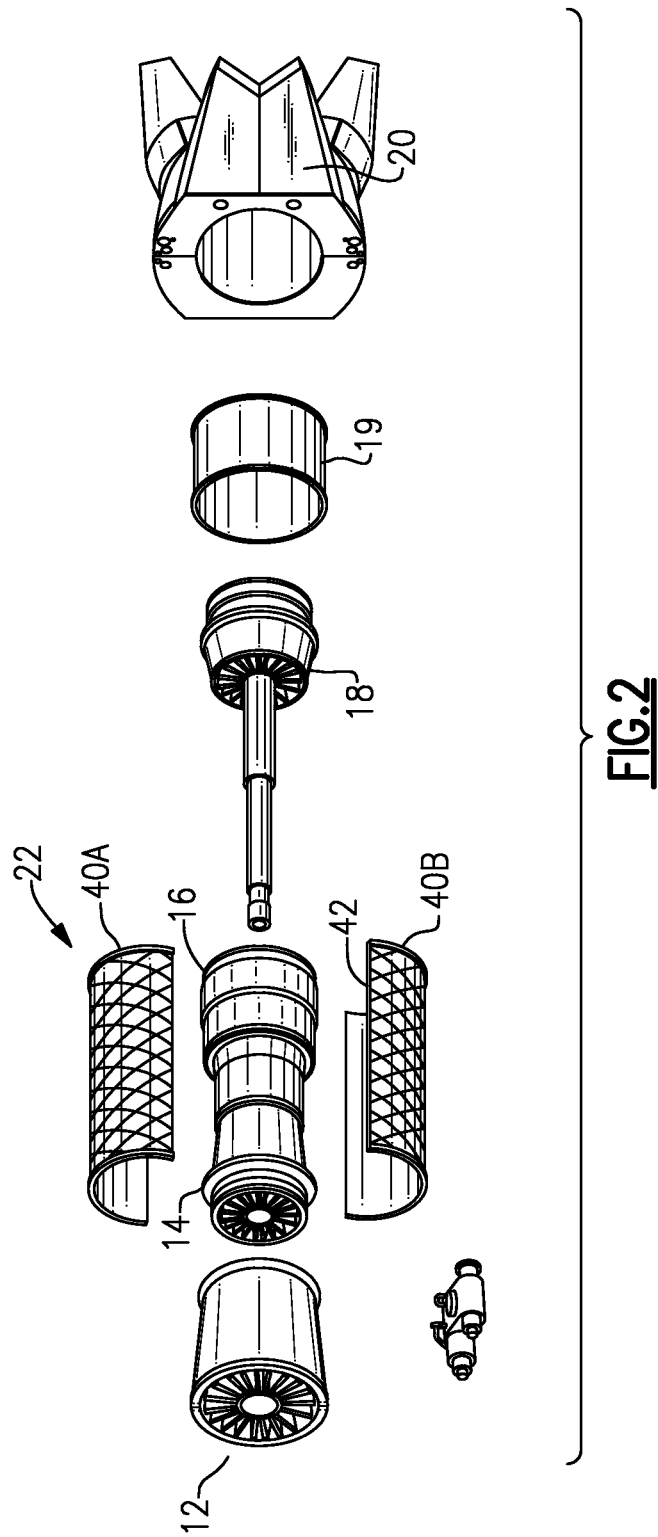
FIG. 2 is a perspective exploded view of the gas turbine engine illustrating the composite bypass duct.

The engine duct structure 22 includes a first duct section 40A which may be an upper half and a second section 40B which may be a lower half (FIG. 2). The first duct section 40A engages the second duct section 40B along an axial interface 42 (illustrated as a lateral section in FIG. 3).

Referring to FIG. 4, the engine duct structure 22 receives a support ring 44 that operates as an interface arrangement for attachment of engine system components such as the fan duct blocker ring 30. It should be understood that although a fan duct blocker ring 30 is illustrated in the disclosed embodiment, various engine system components which are mounted to the engine duct structure 22 will also benefit from the present invention.

The support ring 44 may be manufactured of a metallic material which replicates the functionality and structural capabilities of a circumferential groove typical of a conventional metal bypass duct. The support ring 44 provides an inner surface 46 that replicates the features of the conventional engine system component receipt groove and an outer surface 48 that presents a generally flat mating surface to transfers loads to the relatively flat surface of the composite engine duct structure 22. The support ring 44 may be split at, for example, the 90° and 270° radial location so as to match the first duct section 40A and second duct section 40B interface (FIG. 3).

Figure 5:
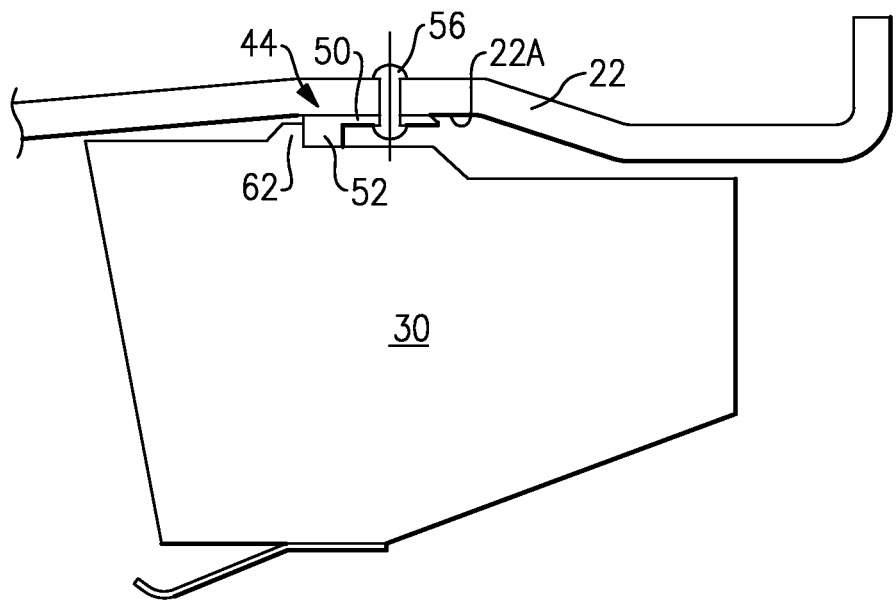
FIG. 5 is a sectional view through the composite bypass duct and support ring taken at line 5-6 in FIG. 4 illustrating an attachment to the composite bypass duct.

The inner surface 46 of the support ring 44 is generally L-shaped in lateral cross-section. The support ring 44 defines a circumferential mating surface 50 and a reinforcement ring 52 which extends toward the engine axis A. The circumferential mating surface 50 extends axially along an inner surface 22a of the engine duct structure 22. The circumferential mating surface 50 includes a multiple of apertures 54 to receive fasteners 56 such as rivets to directly attach the support ring 44 to the engine duct structure 22 (FIG. 5).

Figure 6:
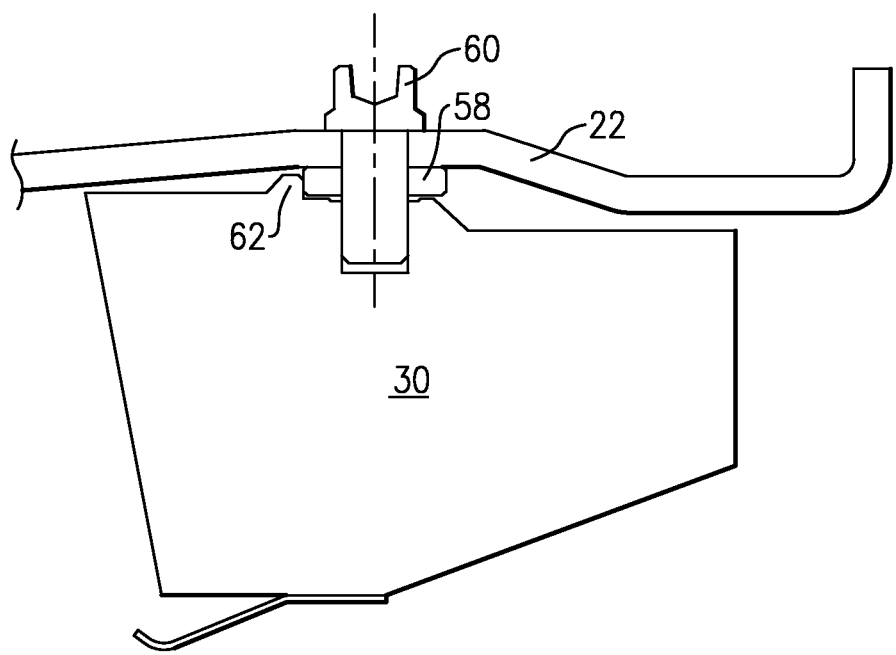
FIG. 6 is a sectional view through the composite bypass duct and support ring taken at line 6-6 in FIG. 4 illustrating the attachment interface for an engine system component to the support ring.

The reinforcement ring 52 transitions into a multiple of reinforcement plates 58 which receive a fastener 60 such as a bolt to attach the fan duct blocker ring 30 (FIG. 6). The fan duct blocker ring 30 may include a radial flange 62 which abuts the reinforcement ring 52 about a circumference thereof. The radial flange 62 is located in an axial upstream position relative the support ring 44 such that the fan bypass flow drives the fan duct blocker ring 30 toward the support ring 44 in an axial engagement relationship. The support ring 44 then interfaces with the engine duct structure 22 through a shear load provided through the fasteners 56 to ensure a structurally sound interface which minimizes the risk of ply delamination of the composite engine duct structure 22.

It should be understood that relative positional terms such as "forward," "aft," "upper," "lower," "above," "below," and the like are with reference to the normal operational attitude of the vehicle and should not be considered otherwise limiting.

It should be understood that although a particular component arrangement is disclosed in the illustrated embodiment, other arrangements will benefit from the instant invention.

Although particular step sequences are shown, described, and claimed, it should be understood that steps may be performed in any order, separated or combined unless otherwise indicated and will still benefit from the present invention.

The foregoing description is exemplary rather than defined by the limitations within. Many modifications and variations of the present invention are possible in light of the above teachings. The disclosed embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A duct for a gas turbine engine comprising:
    a first composite duct section defined along a longitudinal axis; and
    a first metallic support ring section mountable to said first composite duct section at least partially about said longitudinal axis, said first metallic support ring section includes a first reinforcement ring section which extends from said first support ring section toward said longitudinal axis, wherein said first metallic support ring section includes a multiple of apertures to receive fasteners which interface with said first composite duct section, said first reinforcement ring transitions into a multiple of reinforcement plates, each of said multiple of reinforcement plates includes an aperture to receive a fastener to mount an engine system component;
    a second composite duct section defined along said longitudinal axis, said second composite duct section mateable with said first composite duct section; and
    a second metallic support ring section mountable to said second composite duct section at least partially about said longitudinal axis, said second metallic support ring section includes a second reinforcement ring section which extends from said second support ring section toward said longitudinal axis, said second metallic support ring section adjacent to said first metallic support ring section.

2. The duct as recited in claim 1, wherein said first support ring section extends approximately 180 degrees about said longitudinal axis.

3. The duct as recited in claim 1, wherein said first support ring section defines an L-shape in lateral cross section.

4. The duct as recited in claim 1, wherein said first support ring section extends axially along an inner surface of said first composite duct section.

5. The duct as recited in claim 1, wherein said engine system component includes a fan duct blocker ring.

6. The duct as recited in claim 5, wherein said engine system component includes a radial flange which abuts said reinforcement ring.

7. The duct as recited in claim 6, wherein said engine system component includes a fan duct blocker ring.

8. The duct as recited in claim 5, wherein said support ring section is mountable to said composite bypass duct through a multiple of rivets which are loaded in shear by said engine system component.

9. The duct as recited in claim 1, wherein said first composite duct section and said second composite duct section extends approximately 180 degrees about said longitudinal axis.

10. The duct as recited in claim 9, wherein said first support ring section and said second support ring section extends approximately 180 degrees about said longitudinal axis.

11. The duct as recited in claim 1, wherein said first metallic support ring section and said second metallic support ring section include respective radially outer surfaces that mate with, respectively, said first composite duct section and said second composite duct section.

12. The duct as recited in claim 11, wherein said first metallic support ring section and said second metallic support ring section include respective radially inner surfaces, the radially inner surfaces having respective L-shaped cross-sectional profiles.

13. The duct as recited in claim 12, wherein short legs of said L-shaped cross-sectional profiles are radially thicker than long legs of the L-shaped cross-sectional profiles.

14. A duct for a gas turbine engine, comprising:
    a first composite duct section defined along a longitudinal axis; and
    a first metallic support ring section mountable to said first composite duct section at least partially about said longitudinal axis, said first metallic support ring section includes a first reinforcement ring section which extends from said first support ring section toward said longitudinal axis;
    a second composite duct section defined along said longitudinal axis, said second composite duct section mateable with said first composite duct section; and
    a second metallic support ring section mountable to said second composite duct section at least partially about said longitudinal axis, said second metallic support ring section includes a second reinforcement ring section which extends from said second support ring section toward said longitudinal axis, said second metallic support ring section adjacent to said first metallic support ring section, wherein said first metallic support ring section and said second metallic support ring section include respective radially outer surfaces that mate with, respectively, said first composite duct section and said second composite duct section, and wherein said first metallic support ring section and said second metallic support ring section project into a flow path bounded by said first composite duct section and said second composite duct section.

15. The duct as recited in claim 14, wherein said first metallic support ring section and said second metallic support ring section each include a plurality of apertures there through.

16. The duct as recited in claim 15, wherein said plurality of apertures includes apertures of different sizes.

17. The duct as recited in claim 14, wherein said first metallic support ring section and said second metallic support ring section include respective first apertures there through and respective second apertures there through, said first apertures receiving first fasteners securing said first metallic support ring section and said second metallic support ring section with, respectively, said first composite duct section and said second composite duct section, and said second apertures receiving second fasteners securing a mating component in a flow path bounded by said first composite duct section and said second composite duct section.

18. The duct as recited in claim 11, wherein each of said first metallic support ring section and said second metallic support ring section includes a radially thinner portion and radially thicker portion adjacent said radially thinner portion, and said radially thicker portion varying in axial length along each of said first metallic support ring section and said second metallic support ring section.

* * * * *